(12) United States Patent
Ritter

(10) Patent No.: US 8,099,661 B2
(45) Date of Patent: Jan. 17, 2012

(54) LOGGING AND EVALUATING MANUAL INTERACTIONS BY USERS TO SUPPORT OPTIMIZING AND STREAMLINING BUSINESS PROCESSES

(75) Inventor: Gerd Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 832 days.

(21) Appl. No.: 11/960,666

(22) Filed: Dec. 19, 2007

(65) Prior Publication Data

US 2009/0164932 A1 Jun. 25, 2009

(51) Int. Cl.
*G06F 17/00* (2006.01)

(52) U.S. Cl. ..... 715/224; 715/744; 715/255; 705/14.25; 705/14.43; 705/301

(58) Field of Classification Search .................. 715/224, 715/744; 705/14.25, 14.43, 301
See application file for complete search history.

(56) References Cited

U.S. PATENT DOCUMENTS

| 7,451,932 B2 * | 11/2008 | Rathus et al. ............ 235/462.15 |
| 7,698,159 B2 * | 4/2010 | Metzger et al. .................... 705/4 |
| 7,720,835 B2 * | 5/2010 | Ward et al. ..................... 707/710 |
| 2003/0056171 A1 * | 3/2003 | Yone et al. ..................... 715/505 |
| 2005/0166160 A1 * | 7/2005 | Bergstrom et al. ........... 715/780 |
| 2009/0019354 A1 * | 1/2009 | Jaiswal et al. ................ 715/224 |

* cited by examiner

*Primary Examiner* — Stephen Hong
*Assistant Examiner* — Matthew Ludwig
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for logging and evaluating activity to support optimizing and streamlining a process, such as a business process. In one aspect, there is provided a computer-implemented method. The method include receiving information representative of activity at a user interface. The received information may be aggregated to form aggregated data. The received information may be evaluated to determine one or more proposals. The evaluation may use the context of a task being performed at the user interface and the activity at the user interface. The one or more proposals may be provided to enable a configuration of a system or a business process with at least one of the proposals. Related apparatus, systems, methods, and articles are also described.

12 Claims, 4 Drawing Sheets

LOGGING AND EVALUATING MANUAL INTERACTIONS BY USERS TO SUPPORT OPTIMIZING AND STREAMLINING BUSINESS PROCESSES

FIELD

The subject matter disclosed herein relates to processes, such as business processes.

BACKGROUND

Work processes in enterprise resource planning (ERP) systems are automated to a large degree but typically do require some user interaction. As a user at a user interface provides information to complete a task, the ERP system may determine and provide additional information to assist in completing the task. For example, when a customer places an order, a user at a user interface may enter the part number of the part being ordered and a customer identifier. The ERP system may provide to the user interface as well as other components additional information (e.g., a ship-to address, a bill-to address, a promised delivery date, and the like). The user at user interface may review the provided information and then complete the task, so that the part order may be processed by other tasks of a workflow used to fulfill the order (e.g., packaged, shipped, and billed to the customer).

SUMMARY

The subject matter disclosed herein provides methods and apparatus, including computer program products, for logging and evaluating activity to support optimizing and streamlining a process, such as a business process, workflow, and the like.

In one aspect, there is provided a computer-implemented method. The method may receive information representative of activity at a user interface. The received information may be aggregated to form aggregated data. The received information may be evaluated to determine one or more proposals. The evaluation may use the context of a task being performed at the user interface and the activity at the user interface. The one or more proposals may be provided to enable a configuration of a system or a business process with at least one of the proposals.

Articles are also described that comprise a computer-readable medium (e.g., tangibly embodied machine-readable medium) operable to cause one or more machines to result in operations described herein. Similarly, a system (e.g., a computer) is described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

In the drawings.

Like reference symbols in the various drawings indicate like elements.

DETAILED DESCRIPTION

Figure 1:
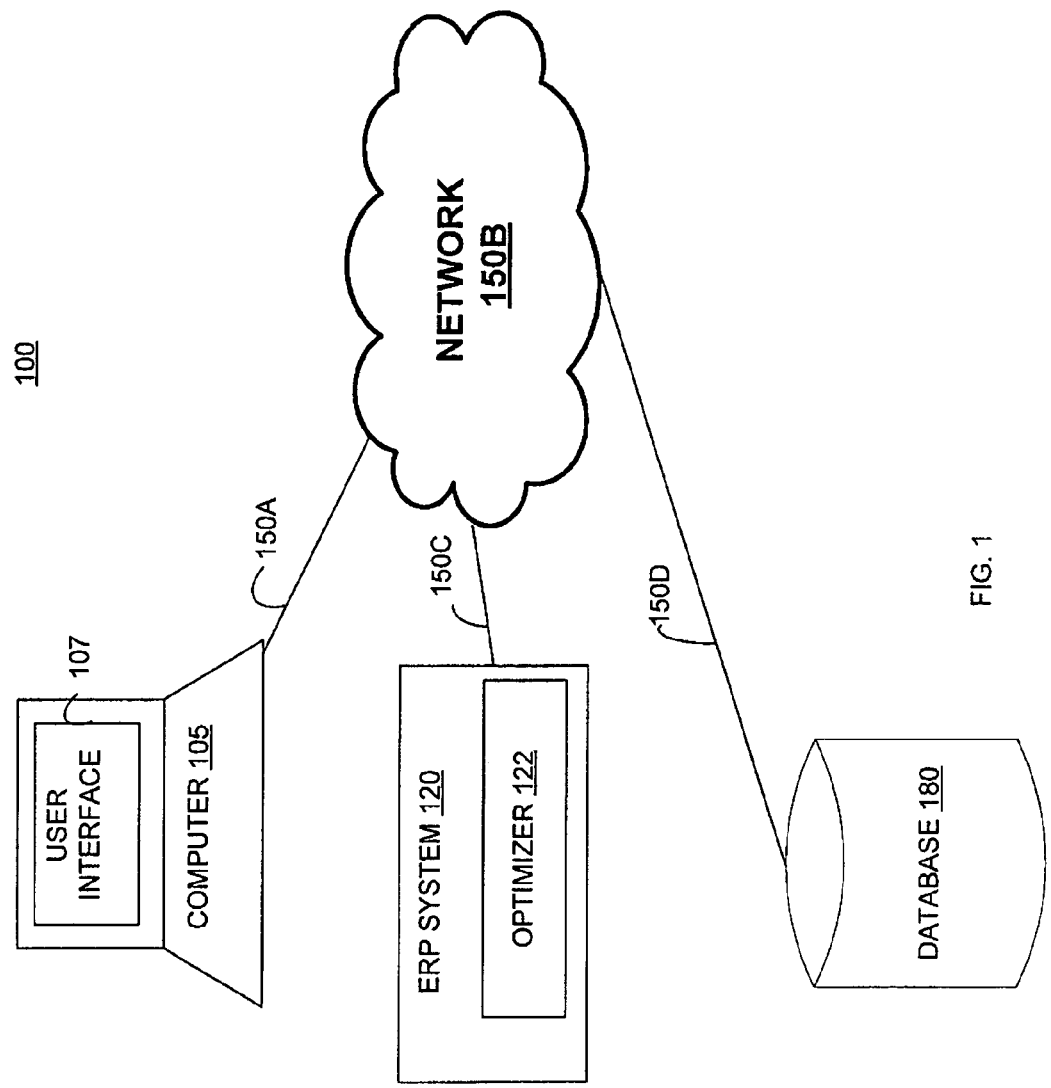
FIG. 1 shows a block diagram of a system for logging and evaluating manual interactions of a user at a user interface to optimize a business process, such as a workflow.

ERP systems may be used to support a process of an entity, such as a company. The ERP system may be set up and master data may be maintained in a way that simplifies a process, such as a workflow. A workflow refers to one or more tasks. For example, a workflow may include the task of taking an order for a part, shipping the ordered part to a customer, billing the customer for the part, and ordering replacement stock for shipped part. An ERP system may automatically provide (e.g., using master data) some of the information to enable one or more tasks of the workflow. For example, when a user takes an order for a part, the description of the part or a customer address may be automatically provided to a user interface and/or another component of the ERP system—minimizing thus the amount of input required by a user.

In some cases, the information that is automatically provided to the user interface and/or another component of the ERP system may not be correct, so that the user at the user interface must correct the error. For example, the ERP system may provide customer information to the user interface, but the customer information may be the address of the chief executive officer (CEO) rather than an address to which parts should be delivered. In this example, each time a user at the user interface takes an order for a part, the user at the user interface changes the address to the correct address (e.g., the correct shipping address)—requiring additional input by the user.

The information provided by the ERP system may be derived automatically based on the current context, such as the current task being performed at the user interface and statistics (and/or patterns in) of the activity as determined by an evaluation of aggregated data representing the activity (e.g., a task) at the user interface. Examples of information that may be provided by the ERP system to the user interface and/or another component include one or more of the following: determining, based on the buyer of a part being ordered, a recipient of the part, a bill-to address, or a contract partner; determining, from a country or a region of origin for a part being ordered, an employee responsible for the order or an appointment for an activity associated with the order; finding, based on a country or a region of a part being ordered, a sales office; finding the relevant installed base for maintenance service order, when a maintenance service request is received as well as finding service locations; pre-filling dates in a document based on existing data (e.g., a proposed delivery date provided automatically based on the order date); default values for units to be used for quantity (kilogram, tons, and the like); duration units (e.g., seconds, minutes, and the like); and ongoing position numbers. In the above noted examples of provided information, the ERP system may access a database of master data including the provided information. The master data may also include enterprise data maintained for the ERP system, such as task information, workflow information, contact information at a customer location (e.g., purchasing, shipping, and the like), addresses, part numbers, a responsible sales person for a country, a maintenance person responsible for a country, and the like.

In some implementations, the context of the task being performed includes information corresponding to multiple documents (or tasks), to a single document (or task), or to a single customer. The context may include statistics and patterns. The context may also include master data and/or aggregated data. For example, statistics may include how often an employee changed documents; for a document type; how often the installed base is not found in a sales order; and how often the user had to type in a service location manually since the service location was not maintained or was missing from master data.

The automatic determination of information may, as described above, be incorrect for various reasons including inaccurate master data from which information is used to provide to a user interface of an ERP system. For example, partner relationship information, such as the recipient of a part or a bill-to address, may not be maintained or the wrong information may be set (e.g., flagged) as a default. Other examples include one or more of the following: no employee or sales unit identified for a region; an incorrect sales unit set as a default; sales units having overlapping and thus conflicting regions; incorrectly defined date rules (e.g., default dates for shipment); and default values not corresponding to what is actually being used by users performing a task at a user interface.

Whenever a user at a user interface has to correct information provided by the ERP system, the user must identify that the proposed information is not correct. In cases where the user does not identify incorrect information at a user interface, the error may result in additional errors (e.g., a part being shipped to an incorrect location, such as a CEO's office rather than a warehouse). The user may manually correct the error in the information presented at the user interface of the ERP system—increasing the number of burdensome manual steps, increasing time, and increasing cost. The business process is thus not streamlined independently of a user.

FIG. 1 depicts a block diagram of a system 100 including a computer 105 (e.g., a computer, a processor, and the like), an ERP system 120, a database 180, and a network 150A-D.

The computer 105 further includes a user interface 107. The user interface 107 may be any mechanism providing an interface to, for example, ERP system 120. For example, user interface 107 may include a browser or a client application to interface with ERP system 120.

User interface 107 may provide a mechanism to present a document, such as a hypertext markup language (HTML) document. The user may provide information at the user interface to complete the document (e.g., elements, such as fields, icons, and the like) of the user interface. For example, when a user takes an order for a part, the user may provide the part number and an identifier for the customer. ERP system 120 may receive through network 150A-D the user provided information, and, in response, ERP system 120 may provide to user interface 107 a description of the part and a ship-to address, so that the document may be completed. In some cases, the user may need to change an incorrect ship-to or other aspect of the document before completing the order. In any case, a user may indicate that the task (in this example an order) is complete, so that the part order may be fulfilled by completing the remaining tasks of the workflow.

ERP system 120 may include one or more components (e.g., applications, services, applets, and the like) to provide an integrated system for the data and processes of an enterprise (e.g., an organization). ERP system 120 may manage a workflow of one or more tasks. Although FIG. 1 depicts ERP system 120, any other application may be used as well including a customer relationship management (CRM) application, a product lifecycle management application, a supply chain management (SCM) application, and a supplier relationship management application.

ERP system 120 may further include optimizer 122. Optimizer 122 may receive information related to activity at a user interface. Examples of received information include one or more of the following: a part number provided by a user at user interface 107; a customer identifier provided by a user at user interface 107; a part description provided by ERP system 120; a ship-to address provided by ERP system 120; a correction made at user interface 107 to the ship-to address provided by ERP system 120; and any other data representative of activity at a user interface when a user performs one or more tasks of a process. The optimizer 122 may also monitor the received information; provide proposals to information provided by a user at user interface 107 to minimize changes by a user; analyze user changes at user interface 107; and identify patterns in the logged data to determine possible proposals provided to user interface 107 (or other components of system 100) to minimize manual effort in subsequent interactions at user interface 107.

Database 180 may include master data, such as enterprise data, task data (e.g., items of work, jobs, and the like) associated with a workflow, information describing one or more users of ERP system 120 and/or user interface 107. Data about users may include one or more of the following: a username, a user ID, a password, a role (e.g., a job function, such as manager, purchaser, and the like), and any other data capable of identifying a user or a user's role in an enterprise.

Figure 2:
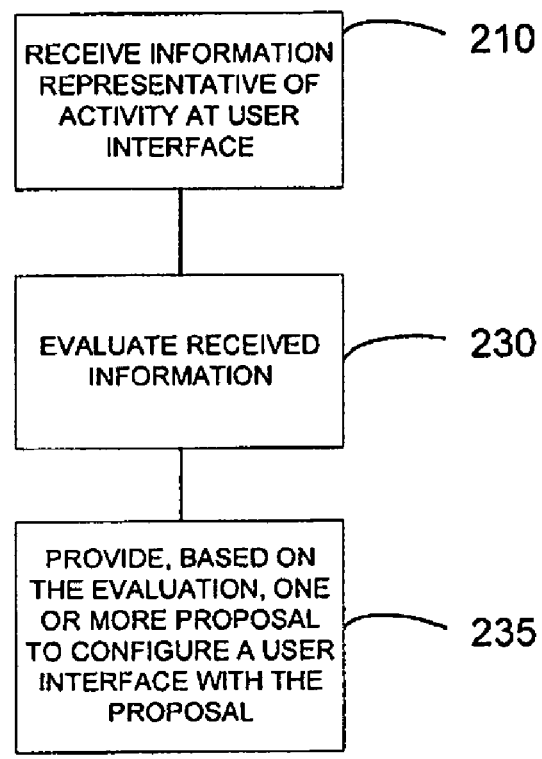
FIG. 2 shows a process of logging and evaluating manual interactions of users at a user interface to optimize a business process, such as a workflow.

FIG. 2 shows a process 200 for logging and evaluating activity (e.g., manual interactions by users of a user interface) to support optimizing and streamlining of business processes, such as one or more tasks of a workflow.

At 210, information is received representative of activity at a user interface. The received information may be aggregated to form so-called "aggregated data." In some implementations, aggregated data is stored as data at database 180. Optimizer 122 may monitor any information provided at user interface 107 and receive the monitored information. For example, as a user receives a request for a part from a customer, the user provides information at user interface 107 as part of the task of taking an order for the part. While completing a document presented at user interface 107, the user may provide a part number and a company name. However, additional information related to the part order may be automatically provided by ERP system 120 (or database 180). In some implementations, optimizer 122 may receive information by directly monitoring activity at user interface 107; while in other implementations, components other than the optimizer 122 provide the received information for aggregation and use by optimizer 122.

Figure 3A:
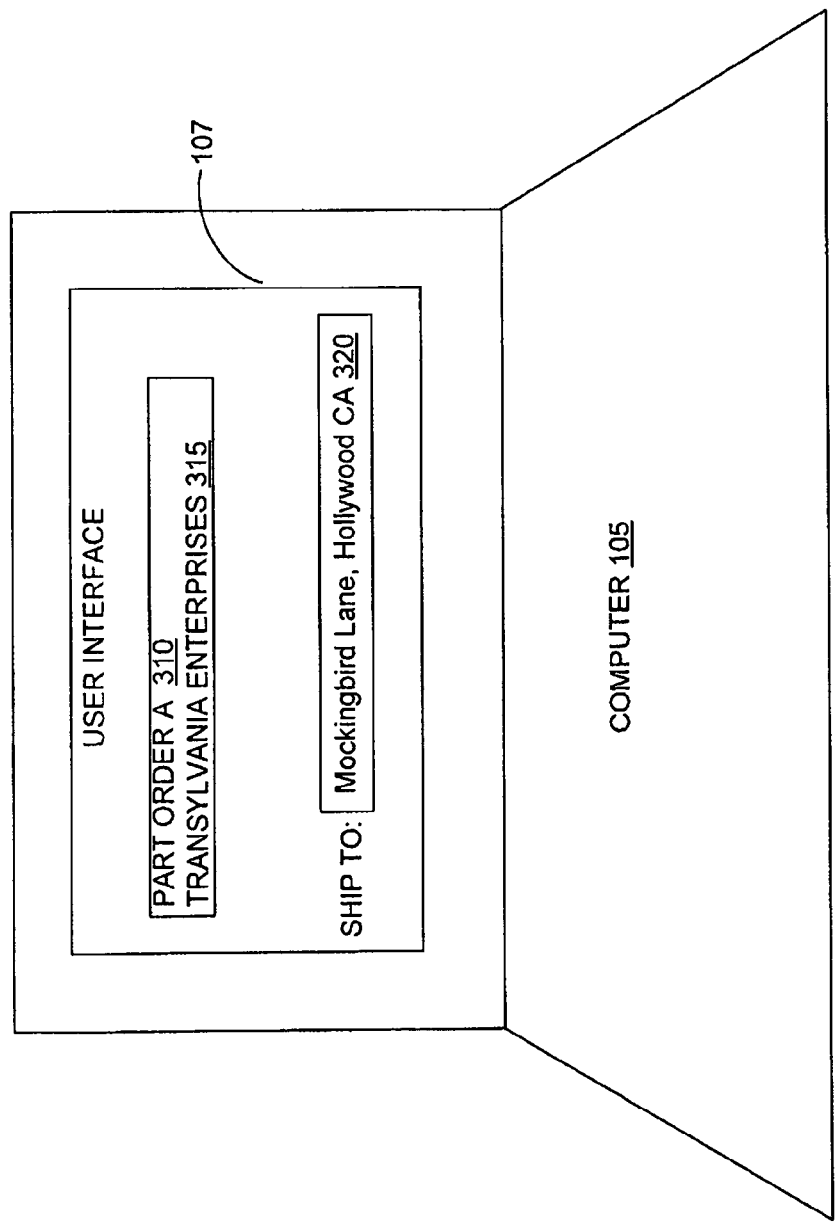
FIG. 3A shows a user interface including activity.

FIG. 3A depicts an example of a user of user interface 107 providing data while taking an order. For example, the user of user interface 107 provided an identifier for the part being ordered (e.g., part order A 310) and the company ordering the part (e.g., Transylvania Enterprises 315). However, additional information, such as the ship-to address (e.g., Mockingbird Lane, Hollywood Calif. 320), related to the part order may be provided by ERP system 120 (or database 180). Optimizer 122 may monitor the data being provided by user interface 107 (e.g., part order A 310 and Transylvania Enterprises 315) as well as the data provided by ERP system 120 (e.g., Mockingbird Lane, Hollywood Calif. 320). In the example of FIG. 3A, a user identifies that the ship-to address is incorrect as that address is the customer's corporate headquarters rather than an actual ship-to address. As such, the user provides the ship-to address of 100 Highway 6, Transylvania, La. (La.). Optimizer 122 also monitors the change to the ship-to address provided by the user. Although the above-example describes specific information being used, optimizer 122 may use aggregated data as well.

Referring again to FIG. 2, at 210, optimizer 122 may receive, in the example described above with respect to FIG. 3A, the following activity information: part order A 310, Transylvania Enterprises 315, Mockingbird Lane, Hollywood Calif. 320, and 100 Highway 6, Transylvania, La. (La.). Optimizer 122 may also receive metadata regarding the context of the transaction. The context of the transaction may include information such as the type of task being performed, the application being used to perform the task, the identity of the user performing the task, and any other information describing the user at user interface 107, the task, or the workflow.

At 230, the received information is evaluated. To evaluate the information, optimizer 122 may store the received information as aggregated data and then analyze any changes made by the user. The analysis may include: identifying what was provided to user interface 107 (e.g., Mockingbird Lane, Hollywood Calif. 320); identifying any changes to information provided by ERP system 120 to user interface 107 (e.g., the change to 100 Highway 6, Transylvania, La. (La.)); who made the change (e.g., the identity of the user and role of the user, such as a purchaser, a shipper, a manager, etc.); any patterns (e.g., frequency of changes, identity of a user making changes, role of a user making changes, etc.) in the changes; statistical data corresponding to the aggregated data; reporting an issue or an alert; and generating a proposal, such as a resolution (e.g., a proposal for use at the user interface or other component of ERP system 100).

At 230, optimizer 122 may, in some implementations, access a business intelligence engine to further evaluate the information received at 210. A business intelligence engine refers to data mining, analytical processing, and alerts to access and present data, search for patterns in the data, and identify exceptions in the data. SAP NetWeaver Business Intelligence is an example of a business intelligence engine, although other mechanisms may be used as well.

At 235, one or more proposals are provided. To provide one or more proposals, optimizer 122 may provide, based on the evaluation, one or more proposals to user interface 107. For example, the evaluation at 230 may identify that an entry (e.g., the ship-to address) at user interface 107 is changed 75% of the time by a user (e.g., a parts clerk) of user interface 107 when an order is taken. When this is the case, optimizer 122 may provide a proposal to user interface 107, so that the proposed value may be used instead. Referring again to the example of FIG. 3A, the evaluation of 230 may identify that the ship-to address Mockingbird Lane, Hollywood, Calif. 320 is changed 75% of the time when an order is being taken by a given user for the customer Transylvania Enterprises. Moreover, the optimizer 122 may also determine as part of the evaluation that 75% of the time, that ship-to address is changed to 100 Highway 6, Transylvania, La. When that is the case, optimizer 122 may provide at 235 a proposal (e.g., 100 Highway 6, Transylvania, La.) so that the default address for this customer is 100 Highway 6, Transylvania, La. rather than Mockingbird Lane, Hollywood, Calif. 320. Optimizer 122 may provide other proposals as well. In some implementations, the proposal is in the form of a so-called "issue" identifying a pattern (e.g., 75% of the time ship-to address changed) without providing a resolution (e.g., without providing the corrected address).

Although the above describes providing the proposal to a user interface, the proposal may be provided to any other component, process, task, or system as well. For example, the proposal may be used to update (e.g., correct) master data at database 180. Moreover, providing the proposal enables a process (e.g., a business process of tasks) to be more closely aligned with the actual workflow of user(s). Furthermore, the proposal provided at 235 is more than a so-called "sanity check" indicating an error in an input since ERP system 120 and optimizer 122 provides the proposal based on at least one of received information (e.g., aggregated data), the context of the task, and the context of the aggregated data (e.g., statistics and patterns of the aggregated data). In some implementations, a user at a user interface may accept (e.g., implement) the proposal or decline (e.g., not implement) the proposal provided at 235.

Figure 3B:
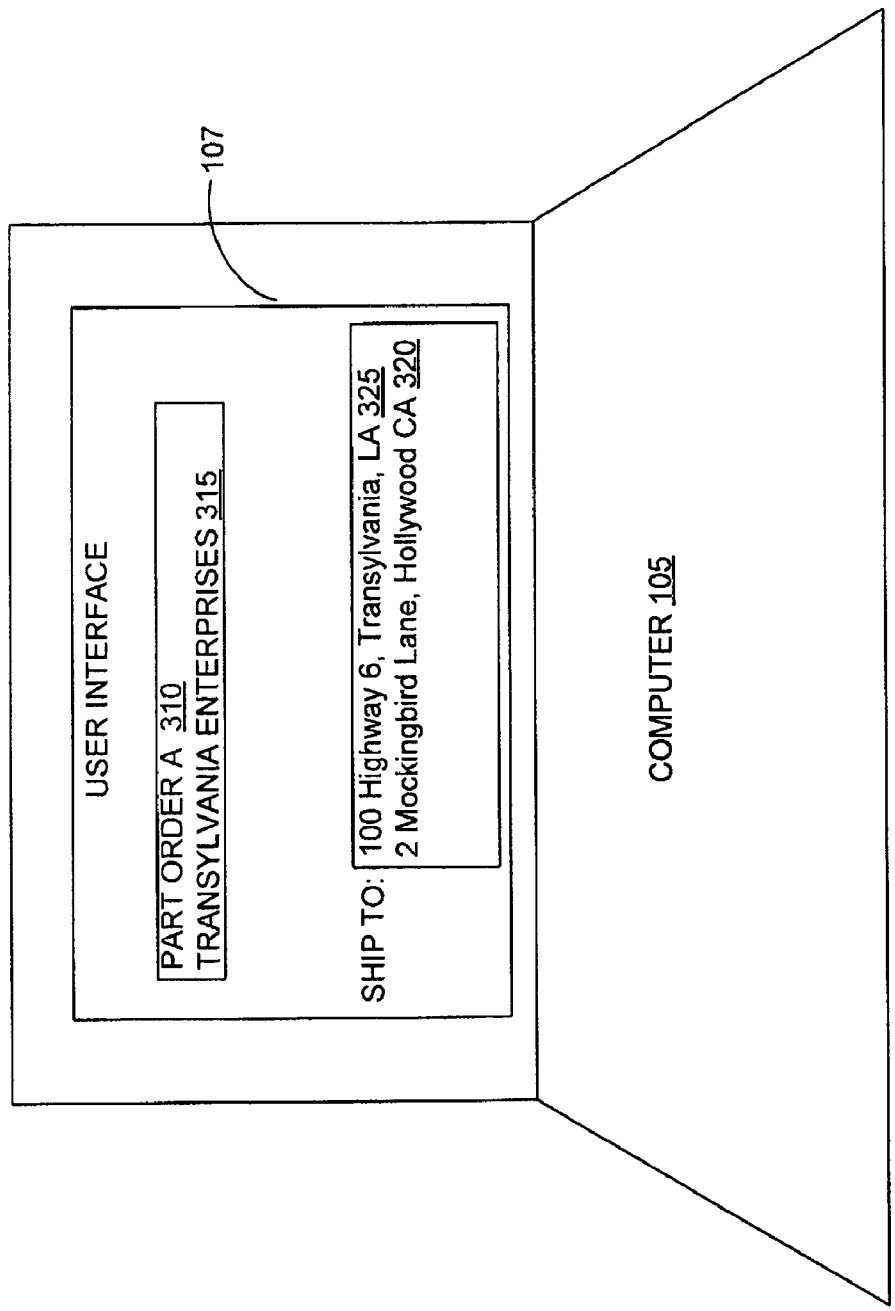
FIG. 3B shows a user interface including a proposal 325 to optimize the business process.

FIG. 3B depicts user interface 107 after the proposal has been provided by optimizer 122 to user interface 107, so that the user of user interface 107 does not have to manually type in the proposed ship-to address (e.g., 100 Highway 6, Transylvania, La. 325). Although FIG. 3B depicts the proposal (e.g., 100 Highway 6, Transylvania, La. 325) in a pick list, the proposal may be presented in user interface 107 in other ways as well. Moreover, in some implementations, a user of user interface 107 may be allowed to select the proposal as a default (or preferred) value for the ship-to address given the context of the transaction (or task). As such, a user of user interface 107 may be able to perform a task (e.g., taking an order) with less manual, when compared to a mechanism that provides incorrect information (e.g., 2 Mockingbird Lane, Hollywood Calif. 320).

Although the above describes an example of placing an order as part of a task of a workflow, other tasks may use the above-described optimizer 122 and process 200. Moreover, although the above example describes an example of optimizer 122 providing a proposal for a ship-to address, any element (e.g., a field, icon, and the like) of a document presented at a user interface may be provided with a proposal based on optimizer 122 and process 200. Furthermore, although FIG. 1 depicts a single user interface 107, in some implementations, a plurality of user interfaces may be used. For example, a plurality of user interfaces may be used to perform tasks of a workflow. In this example, each user interface and each associated task may be processed using optimizer 122 and process 200. Although the examples described herein refer to an ERP system, any other system may be used as well.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. Although FIG. 1 depicts network 150A-D, components of system 100 may be interconnected by any form or medium of communication, example of which include point-to-point links, a bus, a local area network ("LAN"), a wide area network ("WAN"), an intranet, and the Internet. The user described above may refer to a human or a machine.

The foregoing description is intended to illustrate but not to limit the scope of the invention, which is defined by the scope of the appended claims. Other embodiments are within the scope of the following claims.

What is claimed:

1. A computer-readable medium comprising instructions which when executed by a processor provide operations comprising:
    monitoring data being provided by a user and an enterprise resource planning system at a user interface during the performance of one or more tasks of a work process by the user;
    receiving, from the user interface, information representative of the data being provided by the user and the enterprise resource planning system at the user interface associated with the one or more tasks of the work process being performed by the user;
    evaluating the received information to determine one or more proposals, the evaluating using the context of the one or more tasks of the work process being performed by the user and activity at the user interface to identify any changes made by the user to the data provided by the enterprise resource planning system at the user interface, wherein the one or more proposals contain information representative of any changes made by the user, the changes differing from the received information and correcting the received information;
    providing, to the user interface, at least one of the one or more proposals determined based on the evaluating, wherein the at least one of the one or more proposals enable the work process to continue using the information representative of any changes made by the user to the data provided by the enterprise resource planning system at the user interface contained in the one or more proposals; and
    accepting, at the user interface, the at least one of the one or more proposals to effect the continued use of the information representative of any changes made by the user to the data provided by the enterprise resource planning system at the user interface.

2. The computer-readable medium of claim 1 further comprising:
    storing the received information to form aggregated data, the aggregated data used to identify a pattern in the received information, the pattern used as the context during the evaluating.

3. The computer-readable medium of claim 1, wherein the evaluating further comprises:
    identifying patterns in the received information, the patterns determined based on at least a frequency of at least one change made by the user to the data provided by the enterprise resource planning system at the user interface, an identity of the user making at least one change to the data provided by the enterprise resource planning system at the user interface, and a role of the user making at least one change to the data provided by the enterprise resource planning system at the user interface.

4. The computer-readable medium of claim 3 further comprising:
    using at least one of the identified patterns to determine at least one of the one or more proposals.

5. The computer-readable medium of claim 1, wherein the providing further comprises:
    providing at least one of the one or more proposals to enable at least one of a system configuration, a business process, or a change to master data.

6. A computer-implemented method comprising instructions that when performed by a computer result in operations comprising:
    monitoring data being provided by a user and an enterprise resource planning system at a user interface during the performance of one or more tasks of a work process by the user;
    receiving, from the user interface, information representative of the data being provided by the user and the enterprise resource planning system at the user interface associated with the one or more tasks of the work process being performed by the user;
    evaluating the received information to determine one or more proposals, the evaluating using the context of the one or more tasks of the work process being performed by the user and activity at the user interface to identify any changes made by the user to the data provided by the enterprise resource planning system at the user interface, wherein the one or more proposals contain information representative of any changes made by the user, the changes differing from the received information and correcting the received information;
    providing, to the user interface, at least one of the one or more proposals determined based on the evaluating, wherein the at least one of the one or more proposals enable the work process to continue using the information representative of any changes made by the user to the data provided by the enterprise resource planning system at the user interface contained in the one or more proposals; and
    accepting, at the user interface, the at least one of the one or more proposals to effect the continued use of the information representative of any changes made by the user to the data provided by the enterprise resource planning system at the user interface.

7. The computer-implemented method of claim 6 further comprising:
    storing the received information to form aggregated data, the aggregated data used to identify a pattern in the received information.

8. The computer-implemented method of claim 6, wherein evaluating the further comprises:
    identifying patterns in the received information, the patterns determined based on at least a frequency of at least one change made by the user to the data provided by the enterprise resource planning system at the user interface, an identity of the user making at least one change to the data provided by the enterprise resource planning system at the user interface, and a role of the user making at least one change to the data provided by the enterprise resource planning system at the user interface.

9. The computer-implemented method of claim 8 further comprising:
    using at least one of the identified patterns to determine at least one of the one or more proposals.

10. The computer-implemented method of claim 6, wherein the providing further comprises:
    providing at least one of the one or more proposals to enable at least one of a system configuration, a business process, or a change to master data.

11. A system comprising:
    a processor; and
    a memory, wherein the processor and the memory are configured to perform a method comprising:

monitoring data being provided by a user and an enterprise resource planning system at a user interface during the performance of one or more tasks of a work process by the user;

receiving, from the user interface, information representative of the data being provided by the user and the enterprise resource planning system at the user interface associated with the one or more tasks of the work process being performed by the user;

evaluating the received information to determine one or more proposals, the evaluating using the context of the one or more tasks of the work process being performed by the user and activity at the user interface to identify any changes made by the user to the data provided by the enterprise resource planning system at the user interface, wherein the one or more proposals contain information representative of any changes made by the user, the changes differing from the received information and correcting the received information;

providing, to the user interface, at least one of the one or more proposals determined based on the evaluating, wherein the at least one of the one or more proposals enable the work process to continue using the information representative of any changes made by the user to the data provided by the enterprise resource planning system at the user interface contained in the one or more proposals; and accepting, at the user interface, the at least one of the one or more proposals to effect the continued use of the information representative of any changes made by the user to the data provided by the enterprise resource planning system at the user interface.

12. The system of claim 11 further comprising:

storing the received information to form aggregated data, the aggregated data used to identify patterns in the received information.

* * * * *